May 1, 1962     J. H. RUHL ET AL     3,032,350
HYDROPNEUMATIC SUSPENSION
Filed June 5, 1958
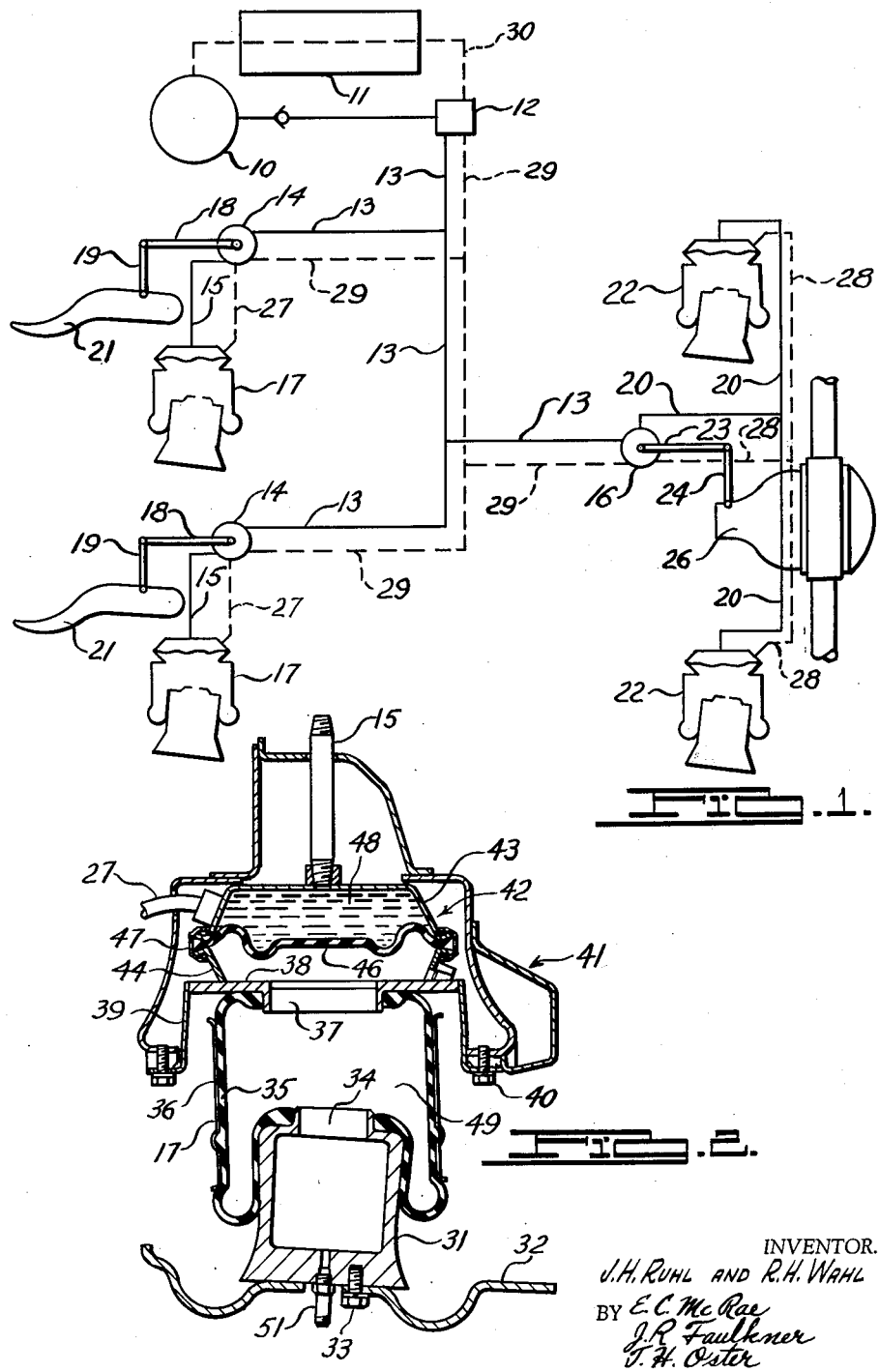
INVENTOR.
J. H. Ruhl and R. H. Wahl
BY E. C. McRae
J. R. Faulkner
J. H. Oster
ATTORNEYS ved May 1, 1962

3,032,350
HYDROPNEUMATIC SUSPENSION
John H. Ruhl, Birmingham, and Robert H. Wahl, Dearborn, Mich., assignors to Ford Motor Company, Dearborn, Mich., a corporation of Delaware
Filed June 5, 1958, Ser. No. 740,150
4 Claims. (Cl. 280—124)

This invention is related to a motor vehicle suspension system and more particularly to a combined air and liquid suspension in which the liquid is used to vary the level of the vehicle in accordance with vehicle height requirements.

The applicants' device utilizes a spring suspension which is quite similar to the conventional air spring. Several vital differences are to be noted, however, which make this system superior to both the air suspension system and the conventional liquid-air suspension heretofore employed in the art.

Applicants' use the air spring diaphragm as found in air suspensions with the top portion of the diaphragm open to a container axially aligned and atop the diaphragm. An elastic member is secured at its peripheral edges within the container to divide it into two sections. The upper section is provided with pressurized liquid inlet and outlet conduits. The position of these conduits is away from the roadbed, hence giving the units a maximum amount of protection from damage. The lower section communicates, of course, with the diaphragm and contains a predetermined charge of gas, preferably nitrogen or air. Because the gas chamber is sealed, moisture, dirt, and freezing problems are eliminated and/or held to a commercially acceptable minimum. Sealing the unit is easy and relatively inexpensive. A high pressure gas chamber is possible for obtaining lower ride frequencies. The leveling operation is simple, quick and efficient. The gas spring valve portion of the unit is changed by increasing or decreasing the volume of liquid entering or leaving the upper liquid chamber. This is done through sensing valves responsive to vehicle height requirements. The pressurized liquid may be obtained from presently used hydraulic pump systems such as the power steering unit, et cetera.

A further advantage of the system is that it lends itself to installations in present day vehicles and particularly those designed for air springs. The unit is substanrtially protected by nesting it with the confines of the chassis sprung portion. The pedestal portion of the unit is secured to the lower suspension arm of the chassis sprung portion. To increase the gas chamber capacity, the pedestal may be hollow and thus be a part of the gas chamber.

Full advantage is taken of a gas spring without the attendant disadvantages of friction and friction breakway common with piston type of gas-liquid combinations. The device is simple, inexpensive, easy to manufacture, and efficient in operation.

Other objects and advantages of this invention will be made more apparent as this description proceeds, particularly when considered in connection with the accompanying drawings, wherein:

FIGURE 1 is a schematic drawing of a system embodying the applicants' invention; and, FIGURE 2 is a cross section of one of the combined liquid and air springs made in accordance with the applicants' invention.

Referring now to the drawings and in particular FIGURE 1, a pump 10 is provided for pumping pressurized liquid 48 received from a reservoir 11 to a control valve 12. Liquid 48 under pressure from the control valve 12 is pumped through inlet conduits 13 to the front leveling valves 14 and the rear leveling valve 16. From the front leveling valves 14, the pressurized liquid is moved through conduits 15 to the combined liquid and air spring 17. Pressurized liquid from the rear leveling valve 16 moves through inlet conduits 20 to the rear air springs 22. The front leveling valves 14 are actuated through a pair of links 18 and 19 which are connected to a suspension member 21 for actuating the leveling valve in accordance with vehicle height variations. Actuation of the rear leveling valve 16 is accomplished through links 23 and 24 which are connected to the differential 26.

The exhaust of pressurized liquid from the combined liquid and gas springs is accomplished in the front suspension by means of return conduits 27 connecting the combined liquid and gas spring 17 with the front leveling valve 14. Conduits 28 connect the rear combined liquid and gas springs 22 with the rear leveling valve 16. From the front and rear leveling valves, the liquid is returned to the control valve 12 through conduits 29 and moves from the control valve 12 to the reservoir through the conduit 30.

Referring now to FIGURE 2, the combined liquid and gas spring 17 comprises a hollow pedestal 31 secured to a lower suspension member 32 of the unsprung portion of the chassis by means of bolts 33. The pedestal 31 is provided with a restricted neck 34 about which a flexible diaphragm 35 is secured. A sleeve-like member 36 is provided about the diaphragm 35 to maintain a fixed radial configuration and permitting the flexible diaphragm to expand axially. Atop the diaphragm 35 is a support plate 38 having an apertured neck extension 37 to which the upper end of the diaphragm 35 is secured. A cylindrical member 39 is secured to the peripheral edge of the plate 38 and extends downwardly to form a flangelike edge through which a plurality of bolts 40 secure the member 38 to the sprung frame portion of the chassis indicated generally at 41.

A container assembly 42 is secured to the upper portion of the plate 38 in axial alignment with apertured neck extension 37 and comprises an inverted cuplike top section 43 and a truncated conelike lower section 44. The two sections are separated by a flexible expansible diaphragm 46 secured between their peripheral edges and the container assembly of the sections 43, 44, and diaphragm 46 is held together by a clamping means 47. The upper section 43 is connected to conduit 15 and is filled with pressurized liquid 48. Exhausting of liquid from the section 43 is done through conduit 27. Beneath the diaphragm 46 is a gas filled chamber 49 which contains a predetermined volume of pressurized gas which entered the chamber through a conventional valve 52 located in the bottom of the pedestal 31.

It can thus be seen that when vehicle height variations are encountered, sufficient to actuate the leveling valves 14 and 16 respectively, pressurized liquid from the pump 10 is forced into the section 43 moving the diaphragm 46 downwards and forcing the diaphragm 35 to extend itself and raise the chassis height. When a lowering of the chassis is directed by the leveling valves, liquid is permitted to leave the cuplike section 43 through conduits 27 to return to the reservoir 11.

It will be understood that the invention is not to be limited to the exact construction shown and described, but that various changes and modifications may be made without departing from the spirit and scope of the invention, as defined in the appended claims.

What is claimed is:

1. A liquid leveled gas spring unit for a motor vehicle having sprung and unsprung chassis members, a source of pressurized liquid and means responsive to vehicle height requirements for varying the amount of pressurized liquid in said unit, comprising in combination a container adapted to be secured to the sprung chassis member of the vehicle, an interiorly hollowed piston adapted to be connected to the unsprung chassis member of the vehicle, a flexible axially extensible diaphragm interposed between the piston and the sprung chassis member in axial alignment with said container and in open communication with said container, a flexible elastic diaphragm secured to the inside of the container dividing the container into a liquid chamber adapted to be connected to the source of pressurized liquid and a gas chamber communicating with the extensible diaphragm, said piston being movable axially inwardly and outwardly of said extensible diaphragm in jounce and rebound movements of the unsprung chassis member, gas valve means in said piston, a charge of predetermined volume of pressurized gas introduced through said valve into the hollowed area of the piston, extensible diaphragm and gas chamber respectively, and pressurized liquid from said source of pressurized liquid in said liquid chamber.

2. The structure defined by claim 1 which is further characterized in that said container comprises an inverted upper cup section and a lower apertured section, said flexible elastic diaphragm being disposed between said sections, and clamping means securing said upper section, flexible diaphragm and lower section together in a seal tight manner.

3. A new and improved liquid leveled gas spring unit for a motor vehicle having sprung and unsprung members, a source of pressurized liquid, and leveling means responsive to motor vehicle height requirements communicating with the source of pressurized liquid and the liquid leveled gas spring, said unit comprising in combination an upper element adapted to be connected to one of said members, a lower element having a hollowed interior portion axially aligned with said upper element and adapted to be connected to the other of said members, an extensible diaphragm of flexible nonstretching material interposed between the upper element and the lower element respectively, said extensible diaphragm having a shell disposed circumferentially about said diaphragm to restrain its movement radially, an additional diaphragm dividing said upper element into a first and second chamber, said first chamber adapted to be connected to the source of pressurized liquid and filled with pressurized liquid, said extensible diaphragm open at the top to communicate with the second chamber and open at the bottom to communicate with the hollowed interior of the lower element, said second chamber, extensible diaphragm and lower element containing a predetermined volume of pressurized gas.

4. A liquid leveled gas spring unit for a motor vehicle having sprung and unsprung chassis members, a source of pressurized liquid and means responsive to vehicle height requirements for varying the amount of pressurized liquid in said unit, comprising in combination a container adapted to be secured to the sprung chassis member of the vehicle, an interiorly hollowed piston adapted to be connected to the unsprung chassis member of the vehicle, a flexible axially extensible diaphragm interposed between the piston and the sprung chassis member in axial alignment with said container and in open communication with said container, a flexible elastic diaphragm on the inside of the container dividing the container into a liquid chamber adapted to be connected to the source of pressurized liquid and a gas chamber communicating with the extensible diaphragm, said piston being movable axially inwardly and outwardly of said extensible diaphragm in jounce and rebound movements of the unsprung chassis member, means for introducing a predetermined volume of pressurized gas into the hollowed area of the piston and the interconnected extensible diaphragm and gas chamber, and pressurized liquid from said source of pressurized liquid in said liquid chamber.

References Cited in the file of this patent

UNITED STATES PATENTS

| 2,134,515 | Hoskyns | Oct. 25, 1938 |
| 2,150,576 | Bell | Mar. 14, 1939 |
| 2,720,274 | Blomquist | Oct. 11, 1955 |
| 2,757,376 | Brueder | July 31, 1956 |
| 2,844,386 | Pribonic | July 22, 1958 |

FOREIGN PATENTS

| 1,088,604 | France | Mar. 9, 1955 |
| 1,152,495 | France | Sept. 2, 1957 |